(12) United States Patent
Yajima et al.

(10) Patent No.: US 8,274,877 B2
(45) Date of Patent: Sep. 25, 2012

(54) OPTICAL PICKUP WITH LIGHT RECEIVING ELEMENT AND HOLDING MEMBER AND METHOD OF MANUFACTURING THE SAME

(75) Inventors: Masatoshi Yajima, Osaka (JP); Kenji Matsumura, Hyogo (JP); Hideki Hayashi, Nara (JP); Yoshiyuki Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 535 days.

(21) Appl. No.: 12/548,674

(22) Filed: Aug. 27, 2009

(65) Prior Publication Data

US 2010/0061211 A1      Mar. 11, 2010

(30) Foreign Application Priority Data

Aug. 28, 2008   (JP) ................................. 2008-219148

(51) Int. Cl.
*G11B 7/00*        (2006.01)
(52) U.S. Cl. ........................................ 369/121; 369/120
(58) Field of Classification Search ....... 257/E21.499–E21.501; 369/43–44.12, 369/116, 121, 122; 438/24–26; 720/600, 720/658, 671, 672
See application file for complete search history.

(56) References Cited

U.S. PATENT DOCUMENTS

| | | | |
|---|---|---|---|
| 5,959,362 A * | 9/1999 | Yoshino | 257/778 |
| 6,928,649 B2 | 8/2005 | Tanabe | |
| 2001/0043520 A1 * | 11/2001 | Yanagisawa et al. | 369/44.11 |

FOREIGN PATENT DOCUMENTS

JP    2003-085782    3/2003

* cited by examiner

*Primary Examiner* — Nathan Danielsen
(74) *Attorney, Agent, or Firm* — Hamre, Schumann, Mueller & Larson, P.C.

(57) ABSTRACT

An optical pickup (10) includes a light emitting element (11), a holding member (14), a light receiving element (18), and a base (13). The holding member (14) is fixed to the base (13) by a combined bonding portion (17). The combined bonding portion (17) is sandwiched between the holding member (14) and the base (13) so as to fix the holding member (14) to the base (13). The combined bonding portion (17) includes a first bonding portion (15) composed of a first adhesive and a second bonding portion (16) composed of a second adhesive having a higher curing shrinkage rate than the first adhesive. The first bonding portion (15) and the second bonding portion (16) are each sandwiched between the holding member (14) and the base (13), and the second bonding portion (16) is provided to cover at least a part of an outer peripheral surface of the first bonding portion (15). A difference between the curing shrinkage rate of the first adhesive and that of the second adhesive is 3.0% or less.

10 Claims, 12 Drawing Sheets

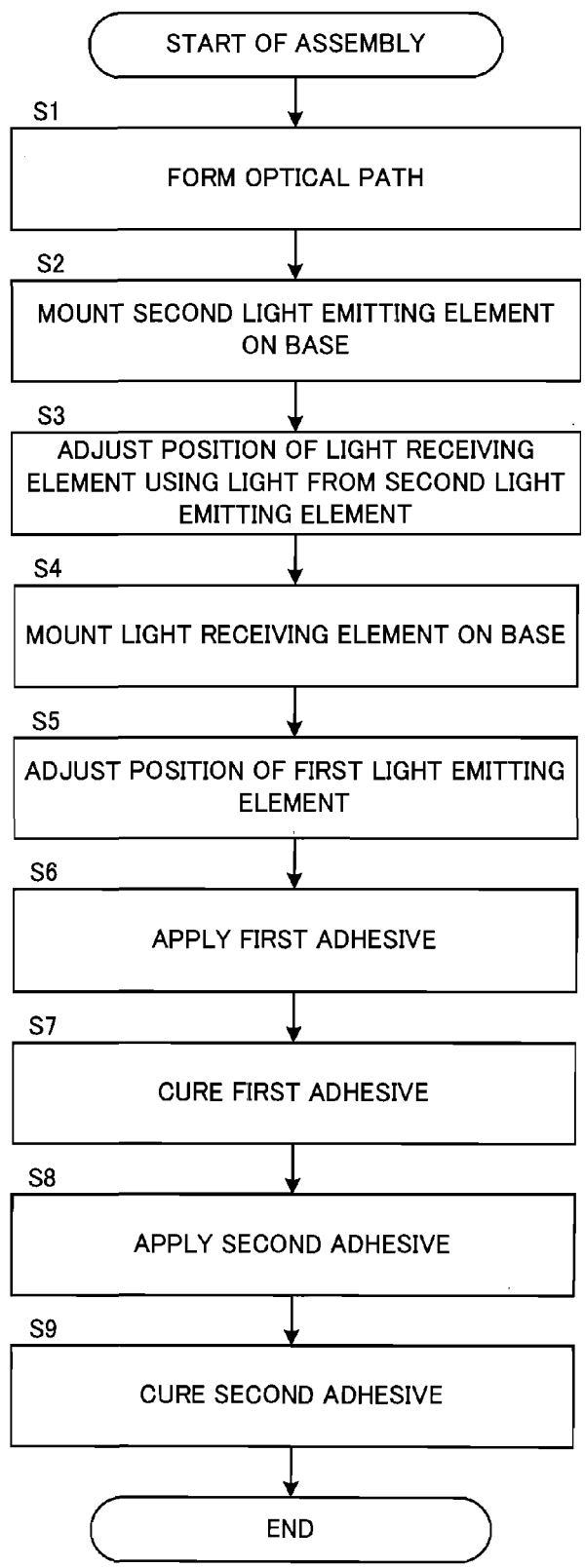

OPTICAL PICKUP WITH LIGHT RECEIVING ELEMENT AND HOLDING MEMBER AND METHOD OF MANUFACTURING THE SAME

BACKGROUND OF THE INVENTION

1. Field of the Invention

The present invention relates to an optical pickup and a method of manufacturing the same.

2. Description of Related Art

An optical pickup is a device for recording information on an optical information recording medium (hereinafter referred to as an optical disk) and reading information from the optical disk. Such optical pickups are used widely in audio equipment, visual equipment, personal computers, and the like. Adhesives are used to assemble optical pickups. For example, JP 2003-85782 A describes a bonded structure as described below.

FIG. 11 is a schematic view of the bonded structure described in JP 2003-85782 A. A base 102 of an optical pickup is provided with two ribs 115. A light receiving element 121 is soldered to a plate 111 at a position not shown in FIG. 11. A first adhesive 131 is filled between the light receiving element 121 and each of the ribs 115, and a second adhesive 132 is filled between the plate 111 and each of the ribs 115. The first adhesive 131 produces a relatively small tensile force when it is cured, while the second adhesive 132 produces a relatively large tensile force when it is cured.

The position of the light receiving element 121 is adjusted to an optimum position relative to a light signal, and then the first adhesive 131 is applied between the light receiving element 121 and each of the ribs 115 and cured. After the first adhesive 131 is cured, the second adhesive 132 is applied between the plate 111 and each of the ribs 115 and cured. JP 2003-85782 A describes that by employing such a procedure, it is possible not only to suppress the displacement of the light receiving element 121 during the assembly but also to ensure the reliability against a temperature change.

SUMMARY OF THE INVENTION

According to the findings of the present inventors, the bonded structure shown in FIG. 11 is not necessarily strong enough to be reliable when an impact, for example a drop impact, is applied to the assembled optical pickup. Specifically, when a drop impact test of the optical pickup is performed, cracks occur in the adhesives 131 and 132, which may cause a significant displacement of the light receiving element 121. When the displacement of an optical element such as a light receiving element becomes larger, reading and writing operations cannot be performed eventually.

In view of these circumstances, it is an object of the present invention to provide an optical pickup that exhibits high reliability against an impact, as well as a method of manufacturing such an optical pickup.

The present invention provides an optical pickup including: a light emitting element for generating a light with which a recoding medium is to be irradiated; a light receiving element for receiving a reflected light from the recording medium; a holding member on which at least one selected from the light emitting element and the light receiving element is mounted; a base to which the holding member is fixed; and a combined bonding portion sandwiched between the holding member and the base so as to fix the holding member to the base. The combined bonding portion includes: a first bonding portion composed of a first adhesive; and a second bonding portion composed of a second adhesive having a higher curing shrinkage rate than the first adhesive, with a difference of 3.0% or less between the curing shrinkage rate of the first adhesive and that of the second adhesive. The first bonding portion and the second bonding portion each are sandwiched between the holding member and the base, and the second bonding portion is provided to cover an outer peripheral surface of the first bonding portion.

In another aspect, the present invention provides a method of manufacturing an optical pickup including: a first light emitting element, fixed to a base via a holding member, for generating a light with which a recording medium is to be irradiated; a second light emitting element for generating a light having a center wavelength different from that of the light emitted from the first light emitting element; and a light receiving element for receiving a reflected light from the recording medium. The method includes the steps of mounting the second light emitting element on the base; causing the light emitted from the second light emitting element to be reflected by the recording medium, and adjusting a position of the light receiving element so that the reflected light is incident on a predetermined optimum position of the light receiving element; after adjusting the position of the light receiving element, determining the position of the light receiving element relative to the base; after determining the position of the light receiving element, causing the light emitted from the first light emitting element to be reflected by the recording medium, and adjusting a position of the first light emitting element in three-dimensional directions so that the reflected light is incident on the optimum position of the light receiving element, while maintaining a state in which the first light emitting element is mounted on the holding member; after adjusting the position of the first light emitting element, applying a first adhesive between the holding member and the base and curing the first adhesive so that a first bonding portion is formed to fix the holding member to the base; and applying a second adhesive between the holding member and the base and curing the second adhesive so that a second bonding portion is formed to be sandwiched between the holding member and base and to cover an outer peripheral surface of the first bonding portion. The second adhesive has a higher curing shrinkage rate than the first adhesive, with a difference of 3.0% or less between the curing shrinkage rate of the first adhesive and that of the second adhesive.

According to the present invention, the first bonding portion is composed of the first adhesive having a relatively low curing shrinkage rate, and the second bonding portion is composed of the second adhesive having a relatively high curing shrinkage rate. The second bonding portion is provided to cover the first bonding portion. With such a combined bonding portion, when an impact is applied to the optical pickup, the second bonding portion reduces the stress to be imposed on the first bonding portion, and thereby, the displacement of the light emitting element and/or the light receiving element can be prevented or suppressed. Accordingly, the present invention can provide an optical pickup that exhibits high reliability against an impact. It should be noted that an excessively large difference in the curing shrinkage rate between the first adhesive and the second adhesive makes it difficult to obtain the above-mentioned effects sufficiently. Furthermore, the present invention makes it possible to mount an optical element on a base with a relatively simple structure. This also is convenient to reduce the size and thickness of optical pickups.

BRIEF DESCRIPTION OF THE DRAWINGS

FIG. 6 is a flow chart of the steps of manufacturing the optical pickup shown in FIG. 1.

DETAILED DESCRIPTION OF THE INVENTION

Figure 1:
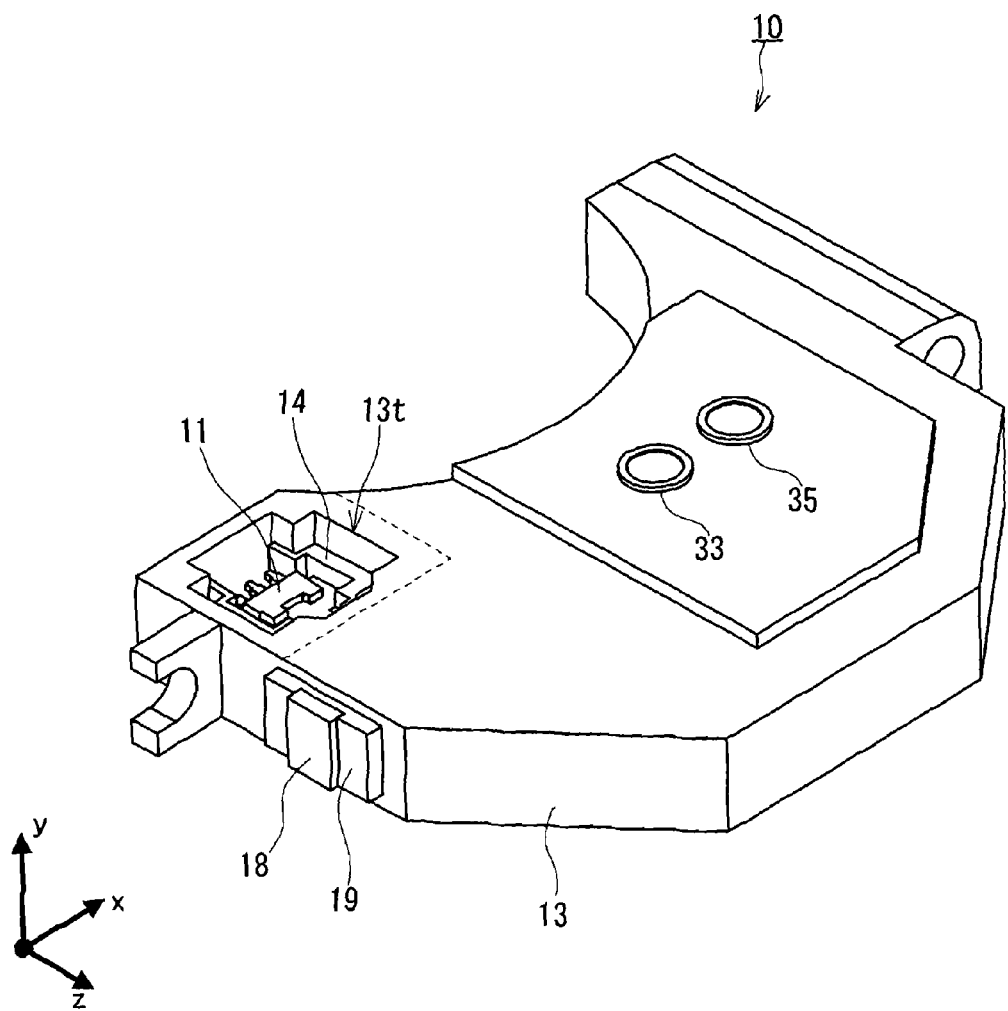
FIG. 1 is a perspective view of an optical pickup according to an embodiment of the present invention.
Figure 2:
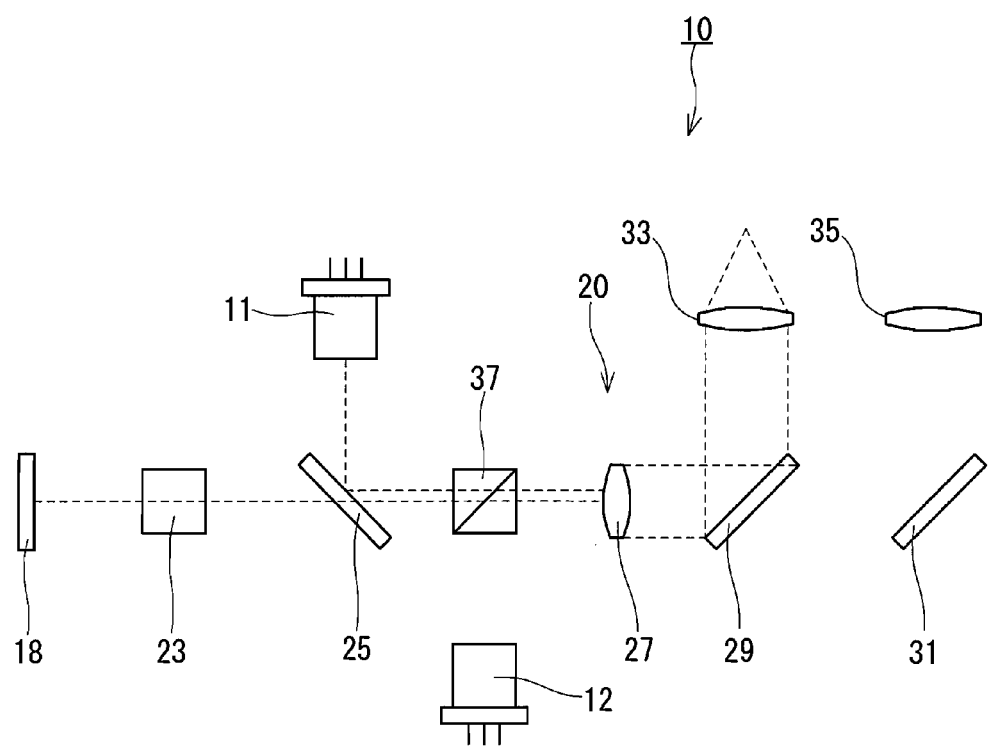
FIG. 2 is a block diagram of the optical pickup shown in FIG. 1.
Figure 3:
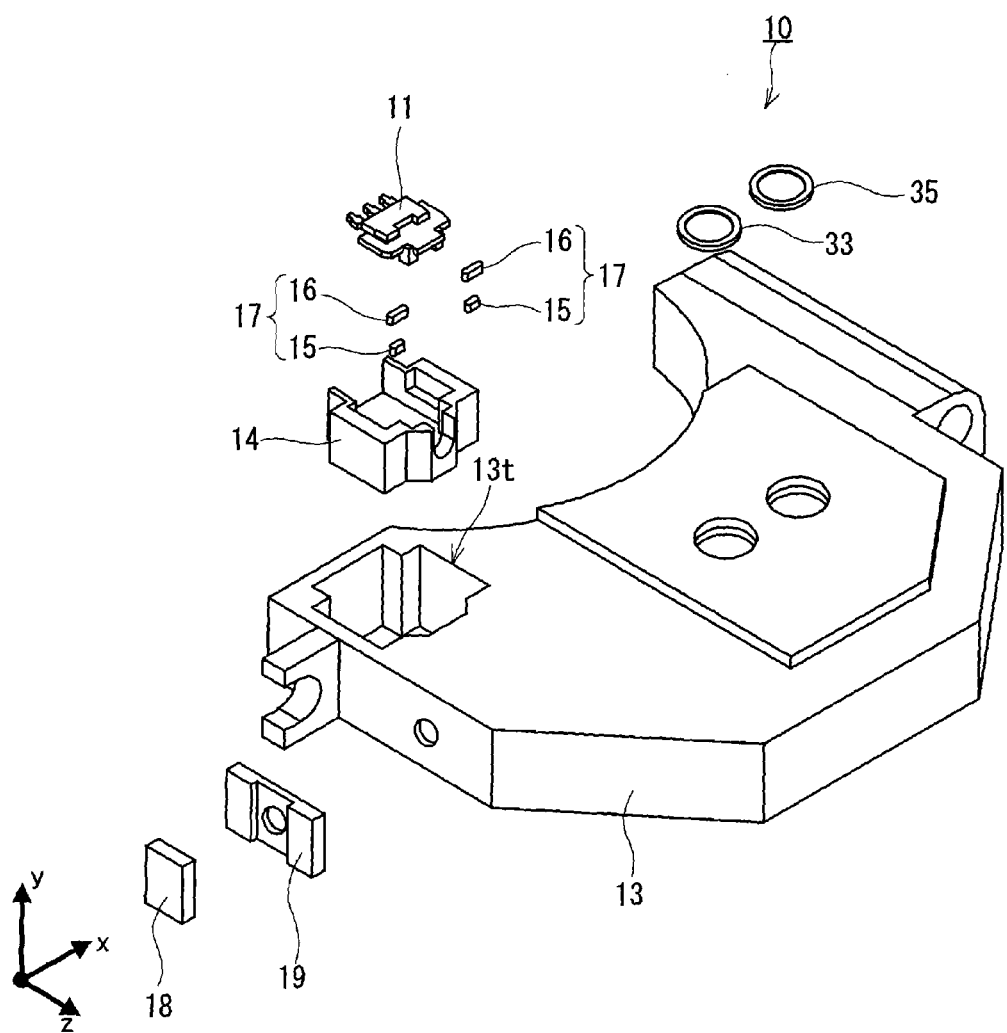
FIG. 3 is an exploded perspective view of the optical pickup shown in FIG. 1.
Figure 4:
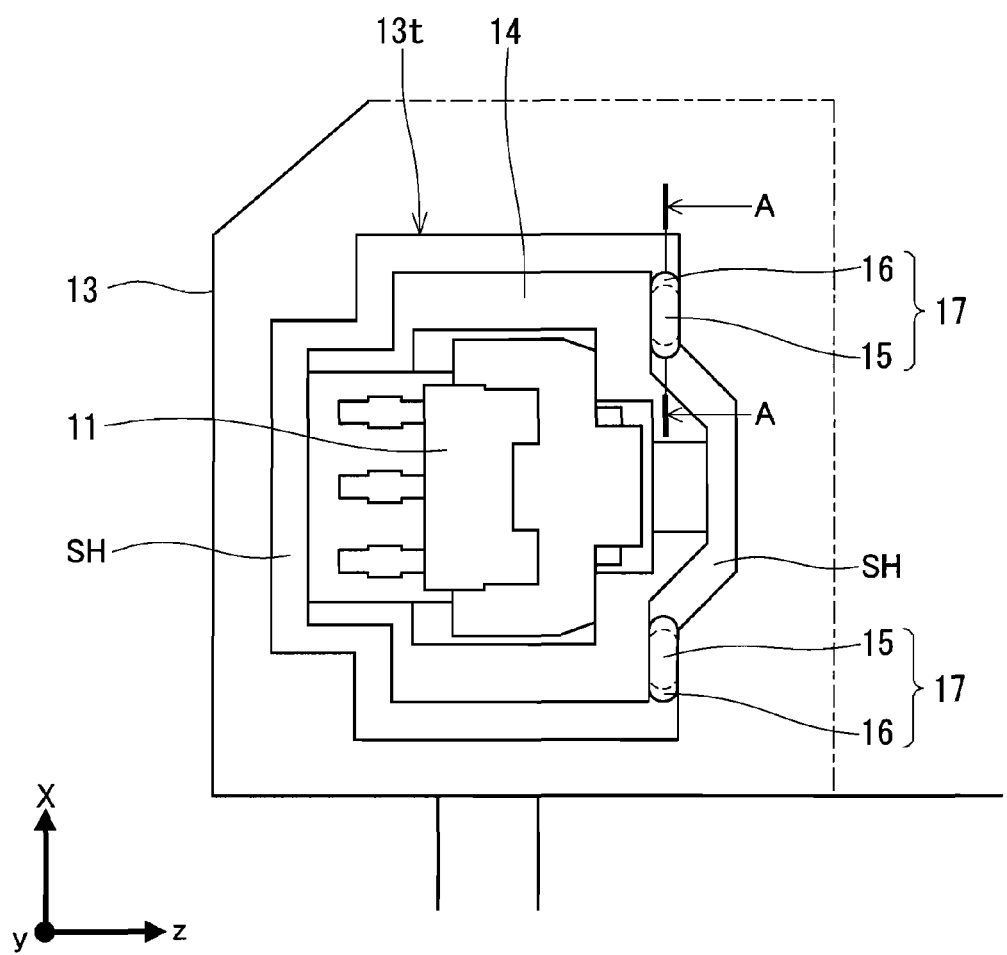
FIG. 4 is an enlarged plan view of the main part of the optical pickup shown in FIG. 1.

FIG. 1 is a perspective view of an optical pickup according to an embodiment of the present invention. FIG. 2 is a block diagram of the optical pickup. FIG. 3 is an exploded perspective view of the optical pickup. FIG. 4 is an enlarged plan view of the main part of the optical pickup.

As shown in FIG. 2, an optical pickup 10 includes a first light emitting element 11, a second light emitting element 12, a light receiving element 18, and an optical path 20. The optical path 20 includes a lens 23, a mirror 25, a prism 37, a collimating lens 27, a first rise mirror 29, a second rise mirror 31, a first object lens 33, and a second object lens 35.

The first light emitting element 11 and the second light emitting element 12 generate lights with which an optical disk is to be irradiated. The second light emitting element 12 generates a light having a center wavelength different from that of a light generated by the first light emitting element. The first light emitting element 11 is, for example, a near infrared-red laser diode having center wavelengths of 790 nm and 660 nm, and used for recording and reproducing information on and from a compact disc and a digital versatile disc. The second light emitting element 12 is, for example, a blue laser diode having a center wavelength of 405 nm, and used for recording and reproducing information on and from a Blue-ray disc.

The light receiving element 18 receives a reflected light from the optical disk and converts the received light signal into an electrical signal. The optical path 20 guides the lights emitted from the light emitting elements 11 and 12 to the optical disk and guides the reflected light to the light receiving element 18. As shown in broken lines in FIG. 2, for example, the light emitted from the first light emitting element 11 passes through the mirror 25 and the collimating lens 27, and reaches the first rise mirror 29. The first rise mirror 29 changes the direction of the light. The light passes through the object lens 33, and the recording surface of the optical disk (not shown) is irradiated with the light. The reflected light from the recording surface travels in the direction opposite to the outward direction and reaches the light receiving element 18.

The optical pickup 10 of the present embodiment includes two light emitting elements and two object lenses, but may include one light emitting element and one object lens.

As shown in FIG. 1, the optical pickup 10 further includes a flat box-type base 13. Though not shown in FIG. 1, the second light emitting element 12 and the optical path 20 are provided in the base 13. The base 13 is driven by a servo system (not shown) so that the object lenses 33 and 35 can scan the recording surface of the optical disk. The first light emitting element 11 is mounted on the holding member 14 fixed to the base 13 with an adhesive. Specifically, the first light emitting element 11 is fixed to the base 13 via the holding member 14. As shown in FIG. 3, the holding member 14 has a box shape, in which the first light emitting element 11 can be contained.

The light receiving element 18 is mounted on a holding member 19 fixed to the base 13 with an adhesive. Specifically, the light receiving element 18 is fixed to the base 13 via the holding member 19 at a position different from that of the first light emitting element 11 so that the first light emitting element 11 and the second light emitting element 12 can share the use of the light receiving element 18. The shared use of the light receiving element 18 by the two light emitting elements 11 and 12 helps to prevent the increase of the number of components required and to miniaturize the optical pickup 10. It should be noted that the light receiving element 18 also can be fixed directly to the base 13.

Figure 5A:
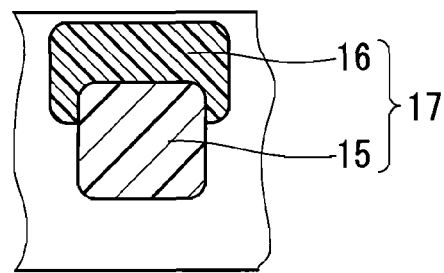
FIG. 5A is a schematic cross-sectional view showing a structure of a combined bonding portion.

As shown in FIG. 3 and FIG. 4, between the base 13 and the holding member 14, combined bonding portions 17 are provided (at two positions in the present embodiment) around the holding member 14 to fix the holding member 14 to the base 13. Specifically, each of the combined bonding portions 17 is formed of a first bonding portion 15 and a second bonding portion 16. The first bonding portion 15 and the second bonding portion 16 are each sandwiched between the holding member 14 and the base 13. The first bonding portion 15 is composed of a first adhesive. The second bonding portion is composed of a second adhesive having a higher curing shrinkage rate than the first adhesive. As shown in FIG. 5A, the second bonding portion 16 is provided to cover a part of the outer peripheral surface of the first bonding portion 15.

With these combined bonding portions 17, when an impact is applied to the optical pickup 10, the second bonding portion 16 can reduce the stress to be imposed on the first bonding portion 15. As a result, the displacement of the first light emitting element 11 relative to the base 13 can be prevented or suppressed. Since the first adhesive that forms the first bonding portion 15 has a relatively low curing shrinkage rate, it is suitable for suppressing the initial displacement (displacement that may occur during assembly). Furthermore, when an environmental test such as a thermal shock test is performed, the displacement can be suppressed by the first bonding portion 15. It should be noted that when the curing shrinkage rate of the second adhesive is excessively higher than that of the first adhesive, it becomes difficult to obtain the above-mentioned effects. Specifically, it is preferable that the difference between the curing shrinkage rate of the first adhesive and that of the second adhesive is 3.0% or less.

A specific example of the first adhesive used in the first bonding portion 15 is an epoxy adhesive. A specific example of the second adhesive used in the second bonding portion 16 is an acrylic adhesive. Since the epoxy adhesive has a relatively low curing shrinkage rate, it is suitable as the first adhesive. Since the acrylic adhesive has a relatively high curing shrinkage rate, it is suitable as the second adhesive. Typically, the first and second adhesives have ultraviolet curing properties. Adhesives having thermosetting properties also can be used.

Specifically, it is preferable that the first adhesive has a curing shrinkage rate of 2.0% or less. It is preferable that the second adhesive has a curing shrinkage rate in a range of more than 2.0% and less than 4.0%. With the combined bonding portion 17 formed by combining such first and second adhesives, the stress that is imposed on the first bonding portion 15 when an impact is applied to the optical pickup 10 can be reduced sufficiently by the second bonding portion 16, and thereby, the displacement of the first light emitting element 11 can be suppressed sufficiently.

It should be noted that a "curing shrinkage rate" can be measured in the following manner. First, the specific gravity Sg1 of an uncured adhesive is measured by the specific gravity cup method specified in JIS K6833. Meanwhile, the mass WA (g) of an adhesive (test sample) that has been cured under appropriate conditions is measured in air. The appropriate conditions are the recommended curing conditions for the adhesive to be tested. After the mass WA is measured, the mass WB (g) of the test sample is measured in distilled water according to JIS K6911. According to the following equations, the specific gravity Sg2 of the test sample is calculated from the masses WA and WB, and the curing shrinkage rate $\Delta V$ (%) thereof is calculated from the specific gravities Sg1 and Sg2. The test is carried out in a room under the standard conditions (25° C.). The distilled water, the adhesives and the test samples are stabilized under the standard conditions (25° C.) in advance.

$$Sg2 = WA/(WA - WB)$$
$$\Delta V = 100 \times \{(1/Sg1) - (1/Sg2)\} / (1/Sg1)$$
$$= 100 \times (Sg2 - Sg1)/Sg2$$

As shown in FIG. 4 and FIG. 5A, the second bonding portion 16 covers the upper half of the outer peripheral surface of the first bonding portion 15. More specifically, when the combined bonding portion 17 is viewed in plan from a predetermined direction perpendicular to the direction of the light emitted from the first light emitting element 11, the second bonding portion 16 is provided in an area extending from the side surface of the first bonding portion 15 to the opposite side surface thereof so as to cover the upper surface of the first bonding portion 15. With the second bonding portion 16 having such a structure, the effect of reducing the stress that is imposed on the first bonding portion 15 when an impact is applied to the optical pickup 10 can be obtained sufficiently.

In the present embodiment, the second bonding portion 16 is larger in volume than the first bonding portion 15. With this relationship, the effect of reducing the stress that is imposed on the first bonding portion 15 when an impact is applied to the optical pickup 10 can be obtained sufficiently.

Figure 5B:
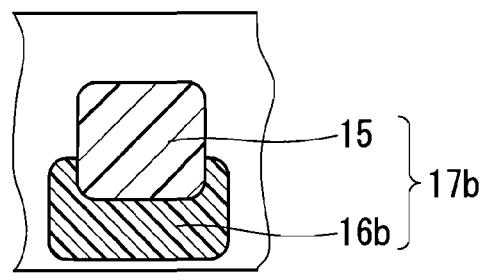
FIG. 5B is a schematic cross-sectional view showing another structure of the combined bonding portion.
Figure 5C:
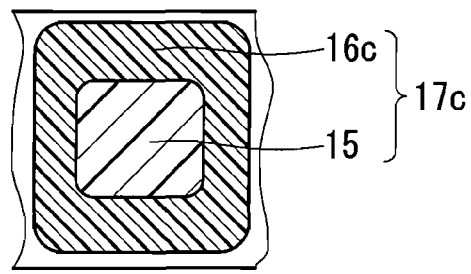
FIG. 5C is a schematic cross-sectional view showing still another structure of the combined bonding portion.
Figure 5D:
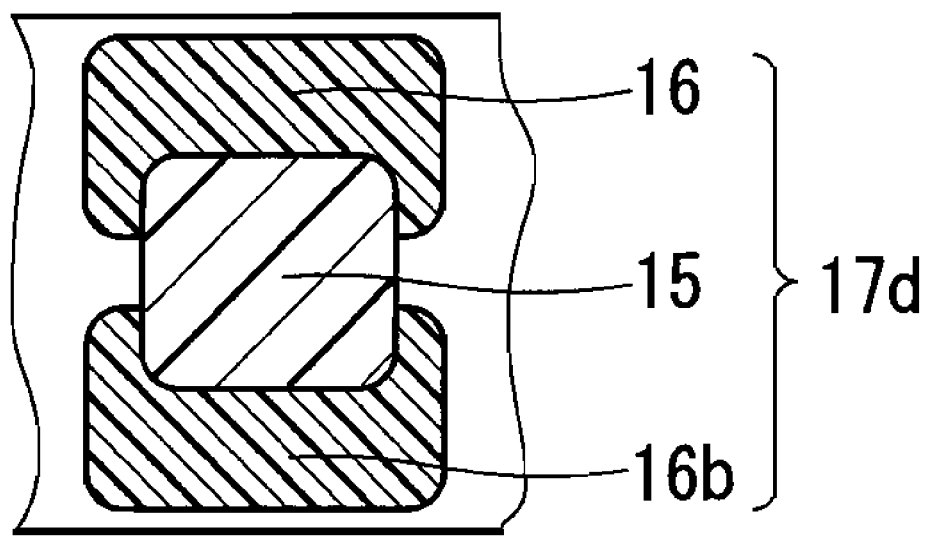
FIG. 5D is a schematic cross-sectional view showing further still another structure of the combined bonding portion.

Suitable variations of the second bonding portion 16 are shown below. As shown in FIG. 5B, for example, a combined bonding portion 17b having a second bonding portion 16b that covers the lower half of the first bonding portion 15 may be provided. As shown in FIG. 5C, for example, a combined bonding portion 17c having a second bonding portion 16c that covers the entire outer peripheral surface of the first bonding portion 15 may be provided. As shown in FIG. 5D, a combined bonding portion 17d having the second bonding portion 16 that covers the upper half of the first bonding portion 15 and the second bonding portion 16b that covers the lower half of the first bonding portion 15 may be provided. The combined bonding portions 17 and 17b shown in FIG. 5A and FIG. 5B are advantageous in preventing the manufacturing steps of the optical pickup 10 from becoming complicated. The combined bonding portions 17c and 17d shown in FIG. 5C and FIG. 5D are advantageous for increasing further the reliability against an impact and an environmental change.

In the present embodiment, the holding member 14 is not in direct contact with the base 13. The holding member 14 is positioned relative to the base 13 only by the combined bonding portion 17. As shown in FIGS. 1, 3 and 4, a direction parallel to a direction of the light emitted from the light emitting element 11 or 12 is defined as a z-direction, a direction parallel to a direction of the light incident on the light receiving element 18 is defined as an x-direction, and a direction perpendicular to the x-direction and the z-direction is defined as a y-direction. The base 13 has a recessed hollow portion 13t extending in the y-direction, that is, a direction parallel to the direction of the light passing through the object lenses 33 and 35. The recessed hollow portion 13t is formed as a frame-like portion in the base 13. The holding member 14 and the first light emitting element 11 mounted on the holding member 14 are placed in this recessed hollow portion 13t. The holding member 14 is placed entirely within the recessed hollow portion 13t, when viewed in plan. A clearance SH surrounding the holding member 14 entirely, except for the combined bonding portion 17, is formed between the outer peripheral surface of the holding member 14 and the inner peripheral surface of the recessed hollow portion 13t. With such a structure, the position and attitude of the first light emitting element 11 can be adjusted easily in all of the x, y and z directions while maintaining a state in which the first light emitting element 11 is mounted on the holding member 14.

Figure 11:
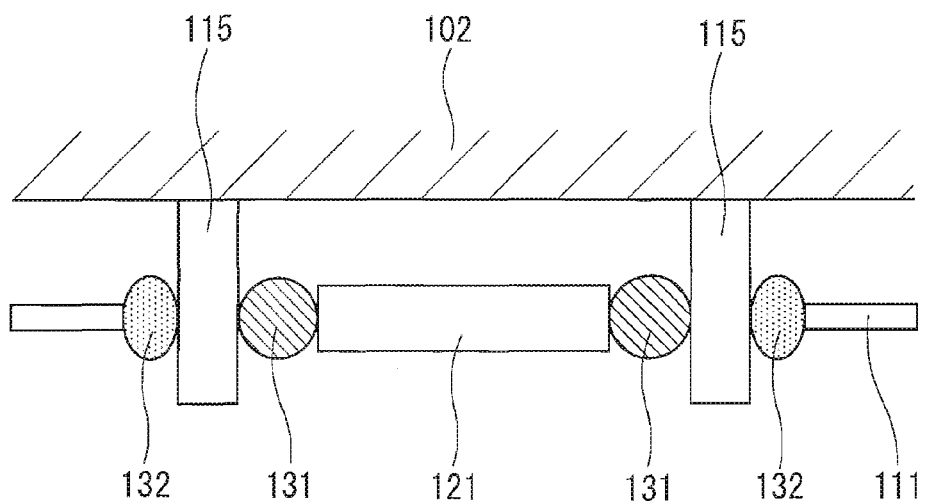
FIG. 11 is a schematic view of a bonding portion of a conventional optical pickup.

In the conventional optical pickup shown in FIG. 11, the plate 111 as a holding member and the ribs 115 for fixing the plate 111 to the base 102 with an adhesive are necessary. In contrast, according to the present embodiment, such ribs 115 are not necessary essentially. Therefore, the present embodiment also is advantageous in reducing the size and thickness of the optical pickup 10. Furthermore, according to the present embodiment, so-called "cradle adjustment" is not necessary. Therefore, it is easier to reduce the thickness of the optical pickup 10. "Cradle adjustment" is a technique for adjusting the distribution of light from an optical element in the following manner. A spherical seat and a spherical bearing are provided on a holding member and a base, respectively. Then, the holding member is mounted on the base so that the spherical seat and the spherical bearing are in contact with each other, and rocked like a cradle while maintaining the state of contact.

Next, a manufacturing method (assembly method) of the optical pickup shown in FIGS. 1 to 4 is described. As shown in a flow chart of FIG. 6, optical components such as a lens and a mirror are placed at predetermined positions in the base 13 to form the optical path 20 in the base 13 (Step S1). Next, the second light emitting element 12 is mounted on the base 13 (Step S2). The second light emitting element 12 is fixed directly to the base 13 in some cases. In other cases, it is fixed to the base 13 via a holding member that has been prepared separately. Next, the position of the light receiving element 18 is adjusted using the second light emitting element 12 (Step S3). Specifically, the light emitted from the second light emitting element 12 is caused to be reflected by the optical disk, and the position of the light receiving element 18 is adjusted relative to the base 13 so that the reflected light is incident on a predetermined optimum position of the light receiving element 18. More specifically, the light receiving element 18 is placed at a position where a balance (hereinafter referred to as a PD balance) of photodiode signals has a value as close to zero as possible. The PD balance can be obtained from the outputs of the light receiving element 18. The details of the PD balance are described later.

The positional adjustment of the light receiving element 18 may be performed while maintaining a state in which the light receiving element 18 is mounted on the holding member 19. The positional adjustment of the light receiving element 18 in the present embodiment basically is a two-dimensional adjustment (adjustment on a yx plane). After the position of the light receiving element 18 is adjusted, the holding member 19 is bonded to the base 13. Thereby, the position of the light receiving element 18 relative to the base 13 is determined (Step S4). It should be noted that if the structure applied to the first light emitting element 11 and the holding member 14 is applied to the light receiving element 18 and the holding member 19, the position of the light receiving element 18 can be adjusted in the three-dimensional directions.

Next, the combined bonding portion 17 is formed to fix the first light emitting element 11 and the holding member 14 to the base 13. Specifically, the light emitted from the first light emitting element 11 is caused to be reflected by the optical disk, and the position of the first light emitting element 11 is adjusted in the three-dimensional directions so that the reflected light is incident on a predetermined optimum position of the light receiving element 18, while maintaining a state in which the first light emitting element 11 is mounted on the holding member 14 (Step S5). In the present embodiment, the holding member 14 is not in direct contact with the base 13. Therefore, the position of the holding member 14 can be adjusted in midair. In other words, the position of the first light emitting element 11 also can be adjusted in the direction of the optical axis. If the position of the first light emitting element 11 cannot be adjusted in the direction of the optical axis, the optimum focus point for RF signals and/or tracking error signals obtained when information is recorded and/or reproduced on and from an optical disk (i.e., a point at which the signal amplitudes are maximum) may increasingly be shifted from the optimum focus point for focus error signals (i.e., a point at which the electrical offset is zero). An increase in the shift makes it difficult to perform focus pull-in. According to the present embodiment, such a problem can be avoided by further adjusting the position of the first light emitting element 11 in the direction of the optical axis.

After the position of the first light emitting element 11 is adjusted, the first adhesive having a relatively low curing shrinkage rate is applied between the holding member 14 and the base 13 so that the first bonding portion 15 is formed to fix the holding member 14 to the base 13 (Step S6). Specifically, a predetermined amount of the first adhesive is filled into a predetermined position in the clearance SH with a dispenser. Subsequently, the first adhesive is irradiated with ultraviolet light to be cured (Step S7). After the first bonding portion 15 is formed, jigs for determining temporarily the position of the first light emitting element 11 are removed. Furthermore, the second adhesive having a relatively high curing shrinkage rate is applied between the holding member 14 and the base 13 so that the second bonding portion 16 is formed to be sandwiched between the holding member 14 and the base 13 and to cover the outer peripheral surface of the first bonding portion 15 (Step S8). A predetermined amount of the second adhesive also is filled into the clearance SH with a dispenser. Subsequently, the second adhesive is irradiated with ultraviolet light to be cured (Step S9). As a result, the optical pickup 10 having the combined bonding portion 17 is obtained.

The necessity of the positional adjustment of the light emitting element and the light receiving element is described. In order to meet the optical performance requirements for the optical pickup, for example, the quality of signals such as jitter, the quality of servo signals for control, and the quality of optical spots such as optical aberration for stabilizing recording/reproduction, the light emitting element and the light receiving element need to be fixed in optically optimum positions. With a recent increase in the recording density of optical disks, the fixing accuracy required has become increasingly strict. Specifically, a displacement of the light emitting element or the light receiving element from the optimum position by only several microns (μm) deteriorates the signal characteristics and degrades the optical performance. Therefore, a bonding method capable of ensuring high reliability against an impact and an environmental change needs to be employed.

Figure 7A:
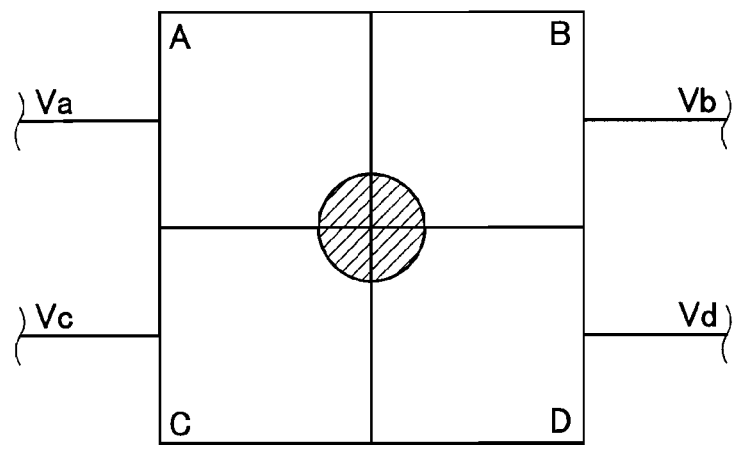
FIG. 7A is a diagram illustrating a method of calculating a PD balance.

The allowable range of displacement of light incident on a light receiving element usually is up to the limit of the servo control. The limit of servo control means that when a PD balance reaches a certain value, an optical pickup gets out of control (that is, the optical pickup falls into a state in which tracking of an optical disk, writing thereon, and reading therefrom cannot be performed). A "PD balance" is a value that is used often in the field of optical pickups. As shown in FIG. 7A, it is assumed that the light receiving element 18 has, for example, four channels. When the reflected light from the optical disk is incident on the light receiving element 18, four outputs Va, Vb, Vc and Vd are obtained in the regions A to D respectively. The PD balance is defined by Equations (1) and (2) below using these outputs Va to Vd.

$$(PD\ balance\ R) = 100 \times \{(Va+Vb) - (Vc+Vd)\}/(Va+Vb+Vc+Vd) \quad \text{Equation 1}$$

$$(PD\ balance\ T) = 100 \times \{(Va+Vd) - (Vb+Vc)\}/(Va+Vb+Vc+Vd) \quad \text{Equation 2}$$

The "PD balance R" indicates a PD balance of the optical spot in the radial direction of the optical disk. The "PD balance T" indicates a PD balance of the optical spot in the tangential direction of the optical disk. A "PD balance" simply means a value obtained by Equation (3) below.

$$(PD\ balance) = \{(PD\ balance\ R)^2 + (PD\ balance\ T)^2\}^{1/2} \quad \text{Equation 3}$$

When the regions A to D equally are exposed to the reflected light, that is, when the center of the reflected light coincides with the center of the light receiving element 18, an equation Va=Vb=Vc=Vd holds true, and therefore the PD balance is zero. In this case, the light emitting element is adjusted to be fixed at the optimum position.

Figure 7B:
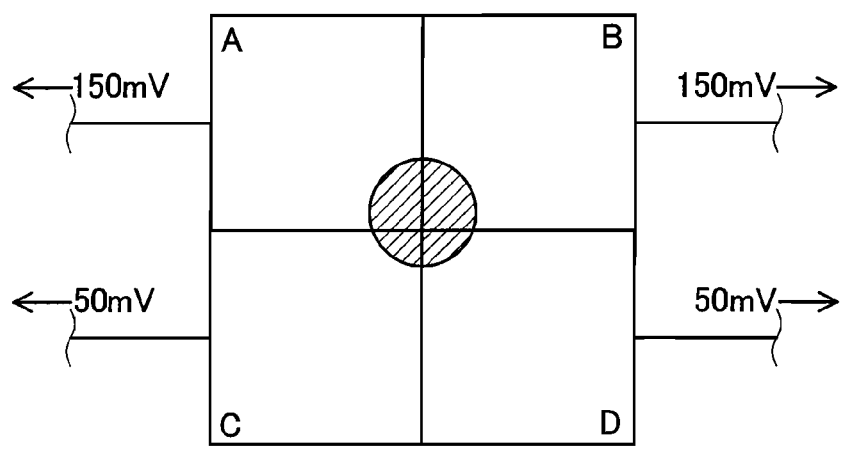
FIG. 7B is a schematic diagram showing a state in which the center of a reflected light spot is shifted from the center of a light receiving element.

On the other hand, as shown in FIG. 7B, when the center of the reflected light is shifted from the center of the light receiving element 18, PD is not zero. For example, in the case of Va=150 mV, Vb=150 mV, Vc=50 mV, and Vd=50 mV, the PD balance is 50%. It should be noted that the light intensity distribution on a plane perpendicular to the optical axis is not a perfect circle but may be an ellipse in some cases.

For example, the maximum allowable value of the PD balance in an optical pickup for a digital versatile disc is about 30%. The PD balance of 30% corresponds to about 7 μm in the displacement of the light emitting element. When it is assumed that variations in the initial PD balance (immediately after the assembly) is about 3 μm, the amount of displacement that can be assigned to the reliability against a drop impact and the like is about 4 μm, which is very difficult to achieve.

In the optical pickup 10 of the present embodiment, even if an impact such as a drop impact is applied thereto, the second bonding portion 16 exhibits an effect of reducing the stress to be imposed on the first bonding portion 15. Accordingly, the displacement (deviation of the optical axis) of the first light emitting element 11 can be reduced significantly. Furthermore, since an adhesive having a relatively low curing shrinkage rate is used as the first adhesive that forms the first bonding portion 15, the initial displacement caused by the curing shrinkage of the adhesive also can be suppressed.

(First Modification)

Figure 8:
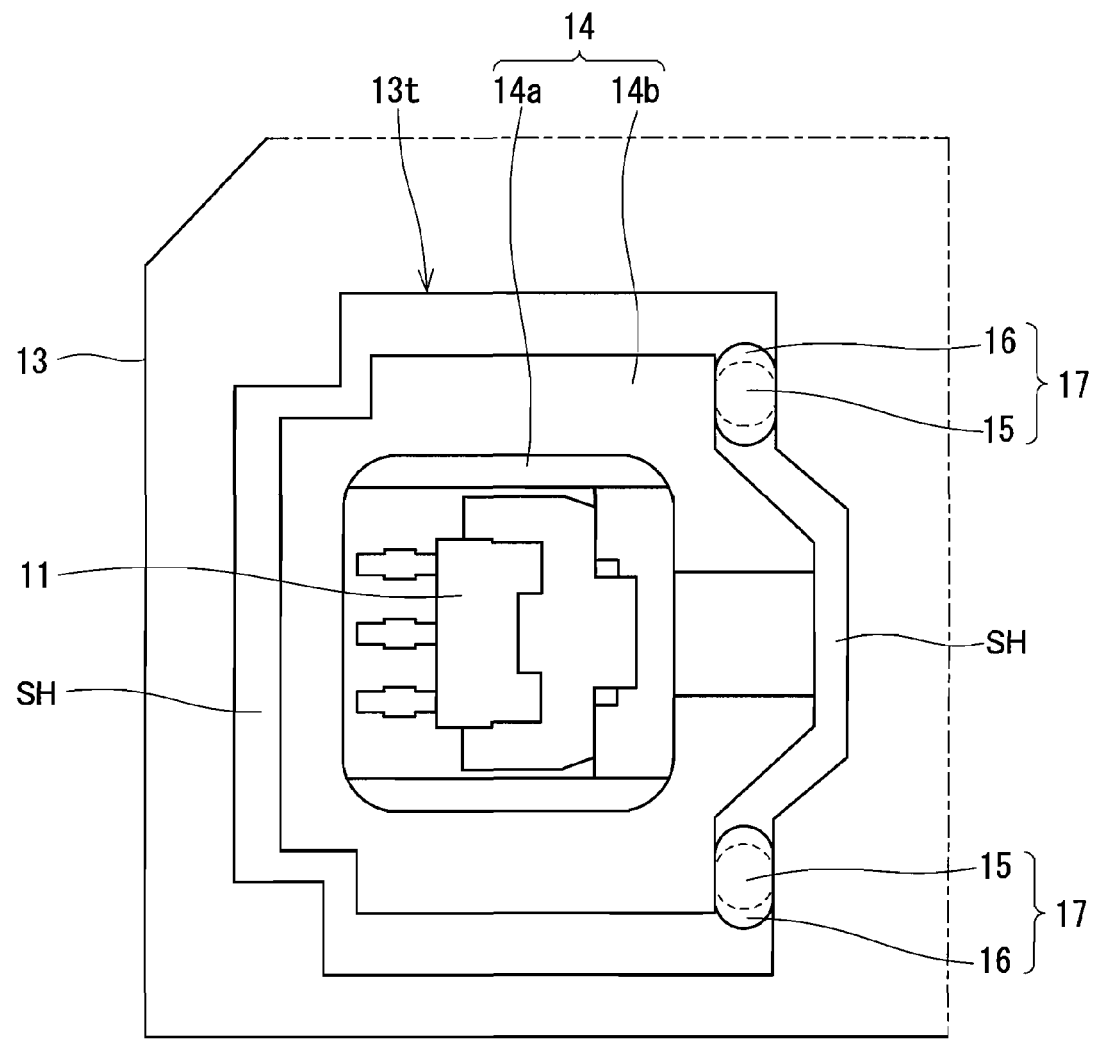
FIG. 8 is an enlarged plan view of the main part of an optical pickup according to a first modification.

FIG. 8 is a plan view of the main part of an optical pickup according to the first modification. Hereinafter, the same components as those in the first embodiment described above are designated by the same reference numerals and no further description is given. In the present modification, the holding member 14 includes a first portion 14a that is in contact with the first light emitting member 11 and a second portion 14b that is not in contact with the first light emitting member 11. The combined bonding portions 17 are provided between the second portion 14b and the base 13, and thereby the holding member 14 is fixed to the base 13. In this way, the holding member 14 can include a plurality of components as in the present modification.

(Second Modification)

Figure 9:
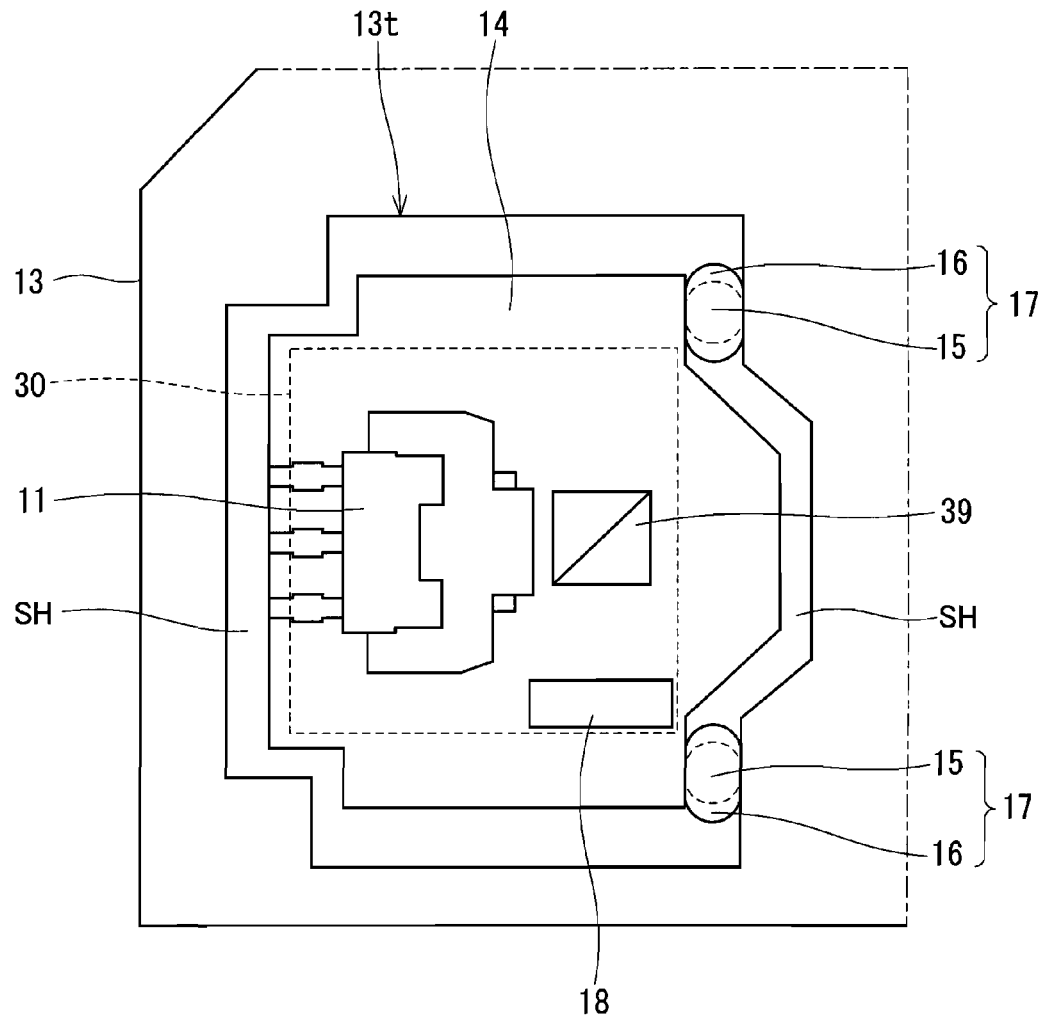
FIG. 9 is an enlarged plan view of the main part of an optical pickup according to a second modification.

FIG. 9 is a plan view of the main part of an optical pickup according to the second modification. In the present modification, an element unit 30 is mounted on the holding member 14. The element unit 30 includes the first light emitting element 11, a prism 39, and the light receiving element 18. Specifically, the light receiving element 18 and the prism 39, in addition to the first light emitting element 11, are mounted on the holding member 14. The light from the first light emitting element 11 is guided to the optical disk through the prism 39. The reflected light from the optical disk is refracted by the prism 39 so that the light is guided to the light receiving element 18. It should be noted that only the light receiving element 18 may be mounted on the holding member 14, as understood from the present modification.

(Third Modification)

Figure 10:
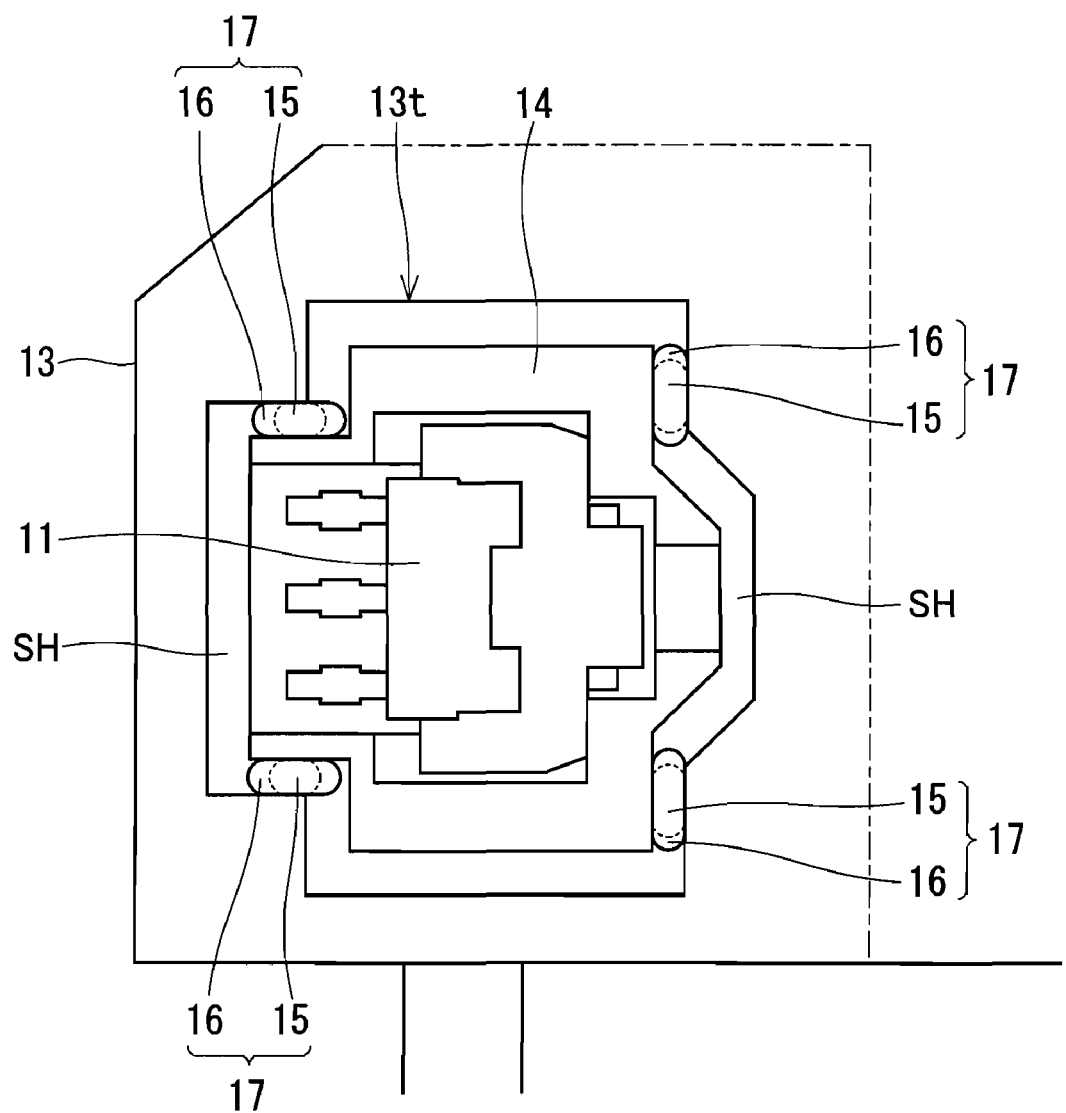
FIG. 10 is an enlarged plan view of the main part of an optical pickup according to a third modification.

As shown in FIG. 10, in the present modification, the combined bonding portions 17 are provided at four positions around the holding member 14. It is preferable that the combined bonding portions 17 are provided at more than one position as in the present modification and the embodiment described above (see FIG. 1). In some cases, however, the combined bonding portion 17 is provided at only one position. An appropriate number of combined bonding portions 17 can be provided to increase the fixing strength as long as such a number of combined bonding portions 17 do not cause problems such as a rise in the manufacturing cost and a decline in the productivity. It should be noted that the holding member 14 may be fixed to the base 13 by a combination of the combined bonding portion(s) 17 and another bonding portion composed of a single type of adhesive.

EXAMPLES

In order to confirm the effects of the present invention, the following experiments were carried out. First, an optical pickup having the structure described with reference to FIGS. 1 to 4 was produced according to the method described with reference to FIG. 6. As the first and second adhesives, six types of adhesives shown in Table 1 were used. The curing shrinkage rates, elastic moduli, and hardnesses shown in Table 1 were all measured at room temperature.

"Type A" and "Type D" in the "Hardness" column shown in Table 1 respectively represent a value (so-called Shore A) measured with a Type A durometer and a value (so-called Shore D) measured with a Type D durometer. The Type A and Type D durometers are specified in JIS (Japanese Industrial Standards) K 6253 (Method for Hardness Test of Vulcanized Rubber and Thermoplastic Rubber). It should be noted that "Type A" "and Type D" respectively correspond to a value measured with a Type A durometer and a value measured with a Type D durometer. The Type A and Type D durometers are specified in ASTM (American Society for Testing and Materials) D 2240 (Standard Test Method for Rubber Property—Durometer Hardness). The hardness of each adhesive means the hardness after it is cured.

TABLE 1

| | Manufacturer (Product No.) | Type | Curing Shrinkage Rate | Elastic Modulus | Hardness |
| --- | --- | --- | --- | --- | --- |
| Adhesive A | ThreeBond (3114) | Epoxy | 1.2% | — | 80 (Type D) |
| Adhesive B | Kyoritsu Chemical (8240) | Epoxy | 1.5% | 3000 MPa | 84 (Type D) |
| Adhesive C | ThreeBond (3114B) | Epoxy | 2.0% | — | 82 (Type D) |
| Adhesive D | ThreeBond (3114E) | Epoxy | 2.9% | — | 75 (Type D) |
| Adhesive E | Kyoritsu Chemical (8840L) | Acrylic | 3.8% | 180 MPa | 70 (Type D) |
| Adhesive F | Kyoritsu Chemical (8125T2) | Acrylic | 5.0% | 1.1 MPa | 50 (Type A) |

16 optical pickups were produced using adhesives A, B, C and D as the first adhesives and adhesives D, E and F as the second adhesives. 2.4 mg of the first adhesive and 3.6 mg of the second adhesive each were used per position. The amount of the second adhesive used was larger in volume than that of the first adhesive. The first adhesive was cured by being irradiated with ultraviolet light of 500 mW/cm$^2$ for 20 seconds. Likewise, the second adhesive was cured by being irradiated with ultraviolet light of 500 mW/cm$^2$ for 12 seconds.

Then, the first light emitting element was energized and the PD balance (initial PD balance) of each of the produced optical pickups was measured.

Next, a drop impact test of the produced optical pickups was performed. The "drop impact test" is a test specified in JIS (Japanese Industrial Standards) C 0041-87 (1995) (current JIS C 60068-2-27) that complies with IEC (International Electrotechnical Commission) 68-2-27. Specifically, the optical pickup was fixed to a holder and a drop impact was applied at an acceleration of 7850 m/s². The drop impact was applied to the optical pickup from six directions while changing the orientation thereof.

The PD balance of the optical pickup that had been subjected to the drop impact test was measured. Table 2 shows the amount of change in the PD balance before and after the drop impact test. Table 2 also shows a difference between the curing shrinkage rate of the first adhesive and that of the second adhesive in each parenthesis.

TABLE 2

Amount of Change in PD Balance Before and After Drop Impact Test (and Difference in Curing Shrinkage Rate)

|  |  | Second Adhesive | | |
|---|---|---|---|---|
|  |  | D | E | F |
| First Adhesive | A | 14.9% (1.7%) | 1.2% (2.6%) | 20.5% (3.8%) |
|  | B | 16.2% (1.4%) | 1.2% (2.3%) | 18.5% (3.5%) |
|  | C | 16.9% (0.9%) | 2.3% (1.8%) | 16.3% (3.0%) |
|  | D | 18.0% (0%) | 8.2% (0.9%) | 16.6% (2.1%) |

As described above, the amount of displacement that can be assigned to the reliability against a drop impact and the like, that is, the amount of displacement that can be allowed after the assembly, is about 4 μm. The displacement of 4 μm corresponds to 17% in the amount of change in the PD balance.

It is hard to say that sufficient reliability could be obtained when using the combinations of adhesives each in which an amount of change in the PD balance is more than 17%, that is, a combination of the adhesive D and the adhesive D, a combination of the adhesive A and the adhesive F, and a combination of the adhesive B and the adhesive F. Presumably, since the same type of adhesives were used in the combination of the adhesive D and the adhesive D, the effect of reducing the stress could not be obtained sufficiently. For confirmation, the optical pickup was assembled using the combination of the adhesive B and the adhesive B, and the drop impact test was performed in the same manner. As a result, the amount of change in the PD balance was 18.1%, which was a poor value. Presumably, since there were too large differences in the curing shrinkage rate when using the combination of the adhesive A and the adhesive F and the combination of the adhesive B and the adhesive F, the effect of reducing the stress could not be obtained sufficiently.

Furthermore, the optical pickup was assembled by applying 6.0 mg of the adhesive B once instead of applying the adhesive(s) in twice, and the drop impact test was performed. After the test, the PD balance could not be measured (because it was 50% or more).

As shown in Table 2, when using the combination of the adhesive A and the adhesive E, the combination of the adhesive B and the adhesive C, and the combination of the adhesive C and the adhesive E, the amounts of change in the PD balance were all 5% or less, which was an excellent value in particular. As shown in Table 1, the adhesives A to C were epoxy adhesives and had curing shrinkage rates of 1.2%, 1.5% and 2.0%, respectively. The adhesive E is an acrylic adhesive and had a curing shrinkage rate of 3.8%. In the case where the first adhesive had a curing shrinkage rate of 2.0% or less and the second adhesive had a curing shrinkage rate of about 4.0%, the amount of change in the PD balance could be reduced significantly. It is considered to be preferable that the curing shrinkage rate of the second adhesive is in a range of more than 2.0% and less than 4.0%. The hardness (Shore D) of the cured first adhesive preferably is in a range of 80 to 84, for example. The hardness of the cured second adhesive preferably is in a range of 70 to 75, for example.

The optical pickup of the present invention is suitable for an apparatus for recording information on an optical disk, an apparatus for reading information from an optical disk and reproducing the information, or an apparatus having both the recording function and the reproducing function. The technique of the present invention is particularly useful for an optical pickup having two or more light emitting elements provided at different positions or an optical pickup having two or more light receiving elements provided at different positions.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical pickup comprising:
   a light emitting element for generating a light with which a recoding medium is to be irradiated;
   a light receiving element for receiving a reflected light from the recording medium;
   a holding member on which at least one selected from the light emitting element and the light receiving element is mounted;
   a base to which the holding member is fixed; and
   a combined bonding portion sandwiched between the holding member and the base so as to fix the holding member to the base, the combined bonding portion including: a first bonding portion composed of a first adhesive; and a second bonding portion composed of a second adhesive having a higher curing shrinkage rate than the first adhesive, with a difference of 3.0% or less between the curing shrinkage rate of the first adhesive and that of the second adhesive, wherein the first bonding portion and the second bonding portion are each sandwiched between the holding member and the base, and the second bonding portion is provided to cover an outer peripheral surface of the first bonding portion.

2. The optical pickup according to claim 1, wherein the first adhesive is an epoxy adhesive, and the second adhesive is an acrylic adhesive.

3. The optical pickup according to claim 1, wherein the curing shrinkage rate of the first adhesive is 2.0% or less, and the curing shrinkage rate of the second adhesive is in a range of more than 2.0% and less than 4.0%.

4. The optical pickup according to claim 1, wherein when the combined bonding portion is viewed in plan from a predetermined direction perpendicular to a direction of the light emitted from the light emitting element, the second bonding portion is provided in an area extending from a side surface of the first bonding portion to an opposite side surface thereof so as to cover an upper surface of the first bonding portion.

5. The optical pickup according to claim 1, wherein the second bonding portion is larger in volume than the first bonding portion.

6. The optical pickup according to claim 1, wherein the holding member is not in direct contact with the base, and is positioned relative to the base only by the combined bonding portion.

7. The optical pickup according to claim 6, wherein
when a direction parallel to a direction of the light emitted from the light emitting element is defined as a z-direction, a direction parallel to a direction of the light incident on the light receiving element is defined as an x-direction, and a direction perpendicular to the x-direction and the z-direction is defined as a y-direction, the base has a recessed hollow portion extending in the y-direction, and the holding member and the light emitting element mounted on the holding member are placed in the recessed hollow portion, and the holding member is placed entirely within the recessed hollow portion, when viewed in plan.

8. The optical pickup according to claim 1, further comprising a second light emitting element for generating a light having a center wavelength different from that of the light generated by the light emitting element, wherein the light emitting element as a first light emitting element is mounted on the holding member, and the light receiving element is fixed to the base directly or via another member at a position different from that of the first light emitting element so that the first light emitting element and the second light emitting element can share the use of the light receiving element.

9. A method of manufacturing an optical pickup including: a first light emitting element, fixed to a base via a holding member, for generating a light with which a recording medium is to be irradiated; a second light emitting element for generating a light having a center wavelength different from that of the light emitted from the first light emitting element; and a light receiving element for receiving a reflected light from the recording medium, the method comprising the steps of mounting the second light emitting element on the base;

causing the light emitted from the second light emitting element to be reflected by the recording medium, and adjusting a position of the light receiving element so that the reflected light is incident on a predetermined optimum position of the light receiving element;

after adjusting the position of the light receiving element, determining the position of the light receiving element relative to the base;

after determining the position of the light receiving element, causing the light emitted from the first light emitting element to be reflected by the recording medium, and adjusting a position of the first light emitting element in three-dimensional directions so that the reflected light is incident on the optimum position of the light receiving element, while maintaining a state in which the first light emitting element is mounted on the holding member;

after adjusting the position of the first light emitting element, applying a first adhesive between the holding member and the base and curing the first adhesive so that a first bonding portion is formed to fix the holding member to the base; and applying a second adhesive between the holding member and the base and curing the second adhesive so that a second bonding portion is formed to be sandwiched between the holding member and base and to cover an outer peripheral surface of the first bonding portion, the second adhesive having a higher curing shrinkage rate than the first adhesive, with a difference of 3.0% or less between the curing shrinkage rate of the first adhesive and that of the second adhesive.

10. The method of manufacturing an optical pickup according to claim 9, wherein the first light emitting element is a near infrared-red laser diode, and the second light emitting element is a blue laser diode.

* * * * *